(12) United States Patent
Renz et al.

(10) Patent No.: US 10,085,919 B2
(45) Date of Patent: Oct. 2, 2018

(54) BOTTLE FEEDING DEVICE

(71) Applicant: Edgewell Personal Care Brands, LLC, Chesterfield, MO (US)

(72) Inventors: Charles Renz, Briarcliff Manor, NY (US); Hassan Mohammed, Bayonne, NJ (US); Michael Jackson, Wooster, OH (US); Steve Casteel, Fulton, OH (US)

(73) Assignee: Edgewell Personal Care brands, LLC., Chesterfield, MO (US)

( * ) Notice: Subject to any disclaimer, the term of this patent is extended or adjusted under 35 U.S.C. 154(b) by 156 days.

(21) Appl. No.: 14/552,669

(22) Filed: Nov. 25, 2014

(65) Prior Publication Data

US 2015/0144584 A1    May 28, 2015

Related U.S. Application Data

(60) Provisional application No. 61/909,001, filed on Nov. 26, 2013.

(51) Int. Cl.
*A61J 9/00* (2006.01)
*B29C 45/00* (2006.01)
*B29C 49/00* (2006.01)
*B29C 49/08* (2006.01)
*B29D 22/00* (2006.01)
*B29K 23/00* (2006.01)

(52) U.S. Cl.
CPC .......... *A61J 9/001* (2013.01); *B29C 45/0001* (2013.01); *B29C 49/0005* (2013.01); *B29C 49/08* (2013.01); *B29D 22/003* (2013.01); *B29K 2023/12* (2013.01); *Y10T 29/49826* (2015.01)

(58) Field of Classification Search
CPC .. A61J 9/001; B29C 45/0004; B29C 49/0005; B29C 49/08; B29D 22/003; Y10T 29/49826; B29K 2023/12
See application file for complete search history.

(56) References Cited

U.S. PATENT DOCUMENTS

| | | | | |
|---|---|---|---|---|
| 1,649,580 A | * | 11/1927 | Geisler | A61J 11/008 215/11.6 |
| 2,659,920 A | * | 11/1953 | Bogan | A45D 34/00 132/73.5 |
| 5,275,298 A | | 1/1994 | Holley, Jr. et al. | |
| 5,678,709 A | | 10/1997 | Holley et al. | |
| 6,186,349 B1 | * | 2/2001 | Tempongko | B65D 11/02 206/309 |
| 6,244,452 B1 | * | 6/2001 | Morano | A61J 9/001 215/11.1 |

(Continued)

*Primary Examiner* — Tri Mai

(57) ABSTRACT

A bottle feeding device, including a bottom piece of a bottle body having a first perimeter wall and a top piece of a bottle body having a second perimeter wall. The top piece is pivotally affixed to the bottom piece and is rotatable with respect to the bottom piece about an axis extending generally orthogonally through the first perimeter wall and the second perimeter wall. A pair of detent feature is provided to restrain the bottom piece and the top piece into either a first relative rotational position or a second relative rotational position. A nipple is operatively affixed to the top piece of the bottle by a nipple ring threaded onto the top piece of the bottle. A method of feeding an infant and of manufacturing the bottle are also provided.

15 Claims, 12 Drawing Sheets

(56) References Cited

U.S. PATENT DOCUMENTS

| | | |
|---|---|---|
| 6,253,936 B1 | 7/2001 | Kong |
| D478,669 S * | 8/2003 | Wear .......................... D24/197 |
| 6,920,991 B2 * | 7/2005 | Holley, Jr. .............. A61J 9/001 |
| | | 206/219 |
| 8,967,434 B2 * | 3/2015 | Lewandowski ....... B05B 15/066 |
| | | 222/383.1 |

* cited by examiner

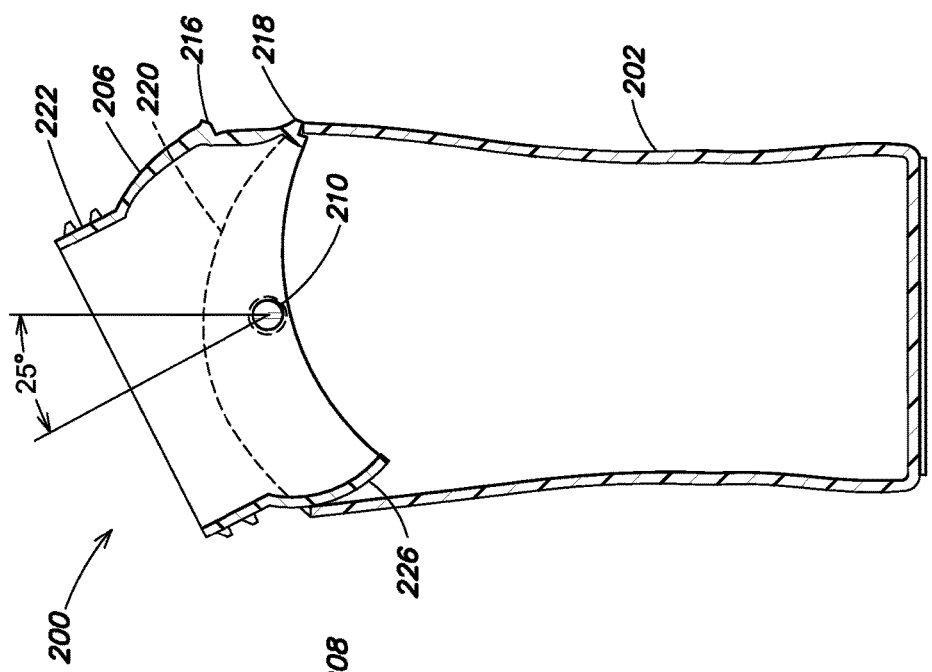
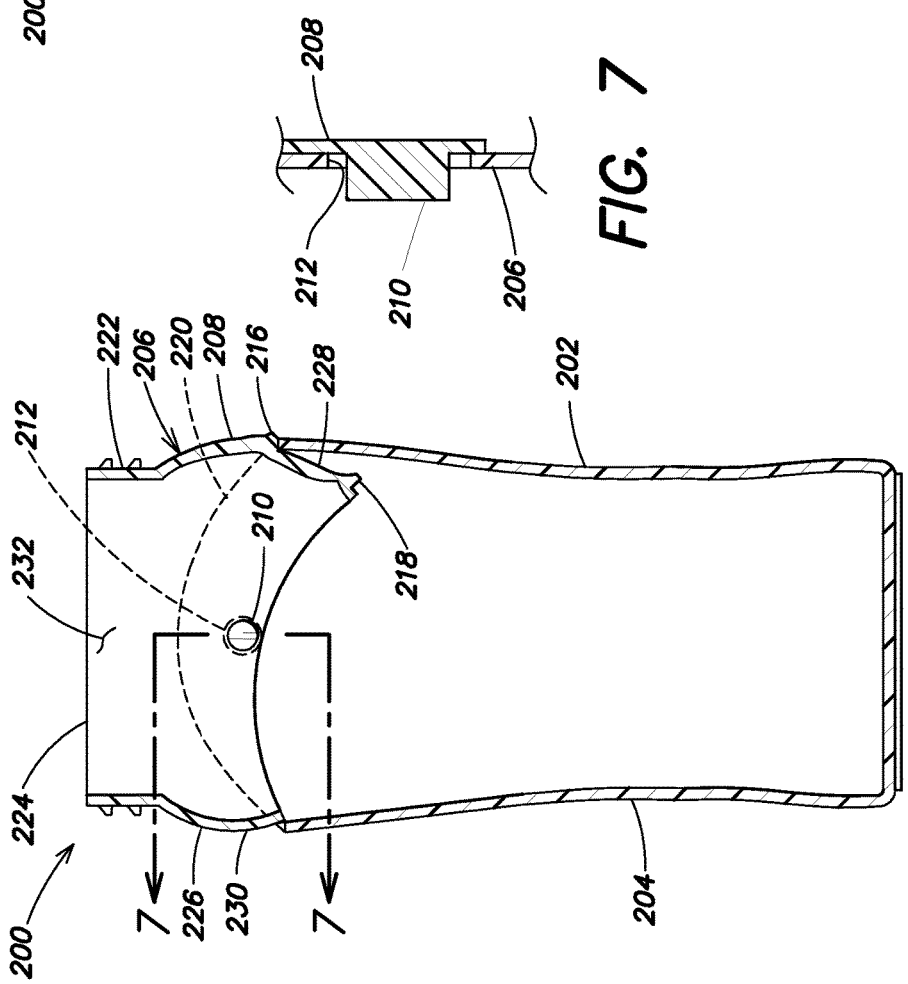

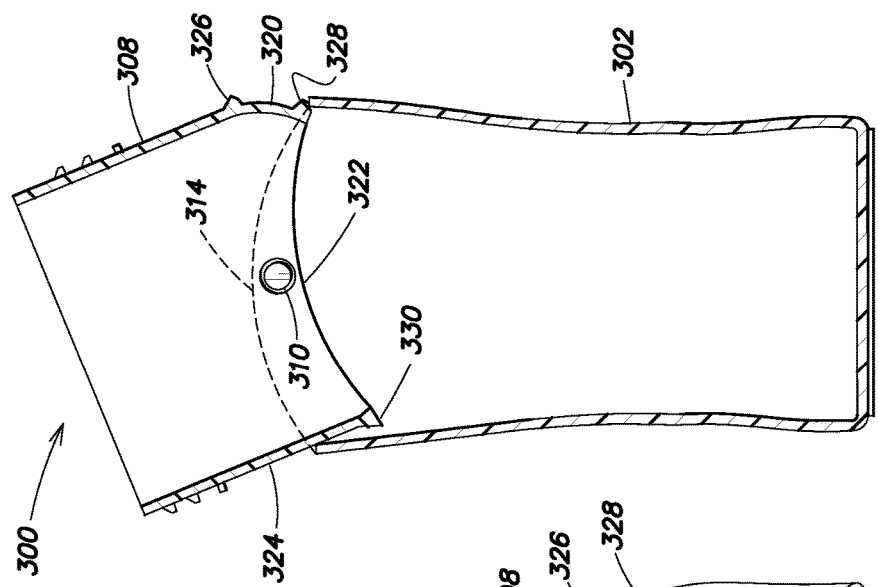
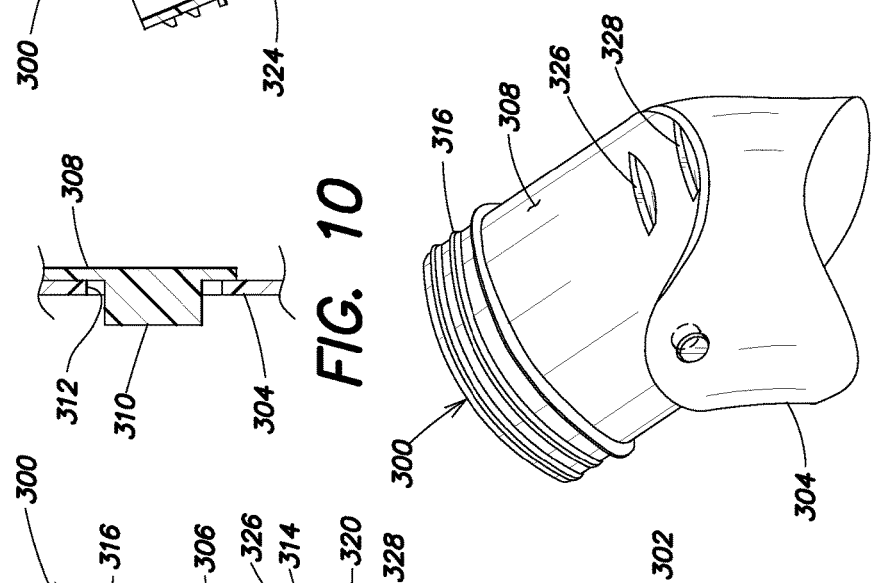
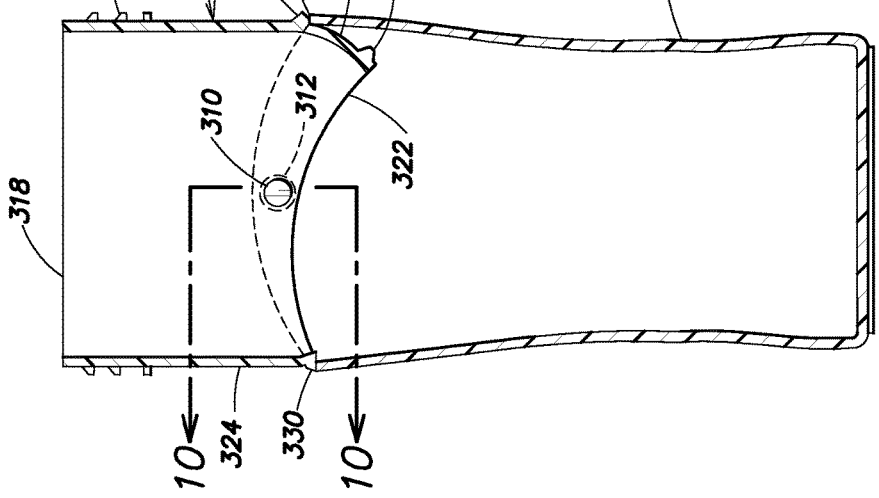

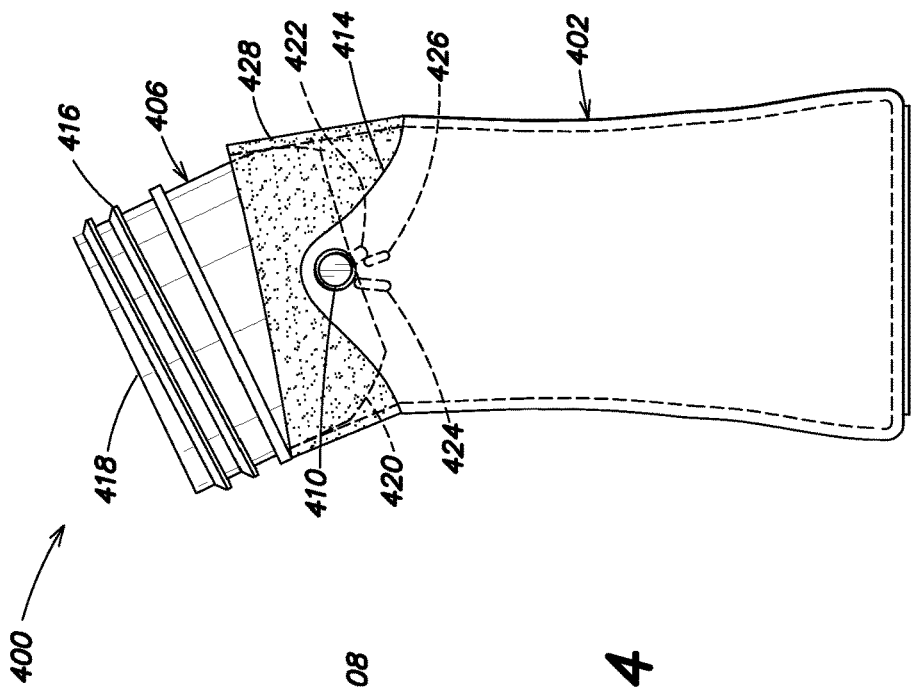
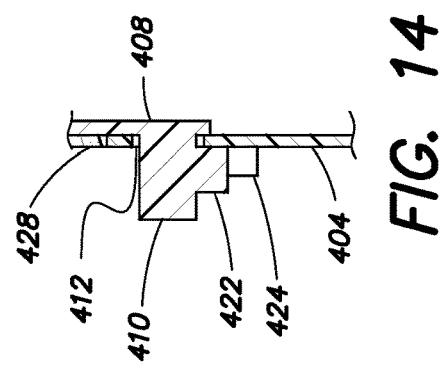
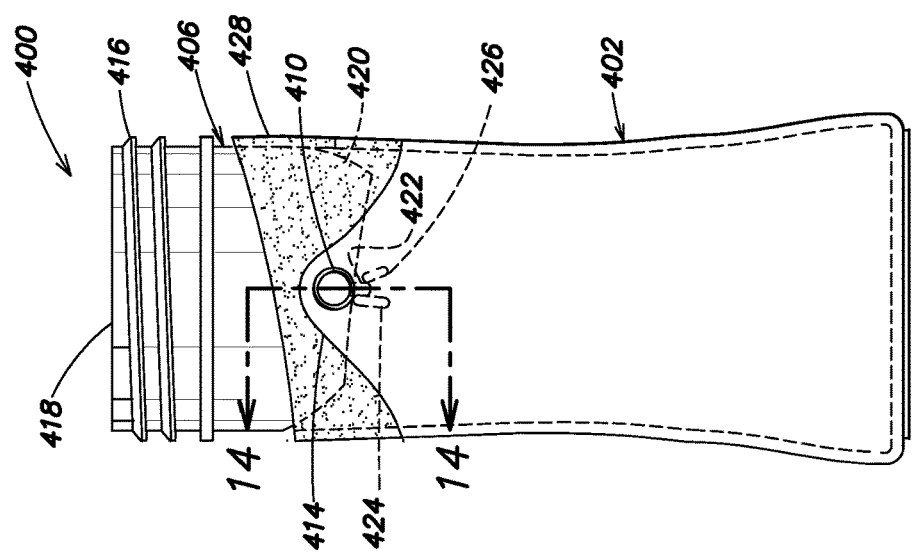

BOTTLE FEEDING DEVICE

This application incorporates and claims the benefit of the filing date of U.S. Provisional patent application Ser. No. 61/909,001, entitled Bottle Feeding Device filed Nov. 26, 2013, the entirety of which is incorporated herein by reference.

The disclosure relates to a bottle feeding device, and particularly to a bottle feeding device that has a bottom piece and a top piece wherein the top piece rotates with respect to the bottom piece to create an angled nursing bottle feeding device.

BACKGROUND

Existing bottles for use with liners to hold liquid have a straight configuration, with a flexible pre-formed liner inside. The straight configuration allows for compact storage of the bottle and for easy filling of the liner while it is in the bottle. To feed an infant with a straight bottle, the caregiver needs to tilt the bottle upside down during feeding to ensure that the liquid is reaching the infant. It is difficult to hold the baby in an upright feeding position as recommended by pediatricians when the bottle has to be turned upside down.

Angled bottles allow for the ergonomic upright feeding position recommended by pediatricians, but it can be more difficult to fill a liner when it is held in an angled bottle, and the bottles can take up more space during storage.

Existing bottles that convert from a straight configuration for filling and storage to an angled configuration for feeding are not intuitive for users, and may result in a twisted liner that restricts the flow of liquid from the bottle.

SUMMARY OF THE INVENTION

A first aspect of the present disclosure includes a bottle feeding device, including a bottom piece of a bottle body having a first perimeter wall and a top piece of a bottle body having a second perimeter wall. The top piece is pivotally affixed to the bottom piece and is rotatable with respect to the bottom piece about an axis extending generally orthogonally through the first perimeter wall and the second perimeter wall.

Embodiments of the first aspect can also include any one or a combination of the following features:
- a pair of detent features to restrain the bottom piece and the top piece into either a first relative rotational position or a second relative rotational position.
- the detent feature includes a first protrusion from the first perimeter wall and a corresponding second protrusion from the second perimeter wall which interacts with the first protrusion to resist rotational motion;
- the detent feature includes a protrusion from the first perimeter wall and a corresponding indent in the second perimeter wall which interacts with the first perimeter wall protrusion to resist rotational motion;
- the angle between a central axis of the bottom piece and a central axis of the top piece is about 0° in the first relative rotational position and the angle between the central axis of the first piece and the central axis of the top piece is about 25° in the second relative rotational position;
- the first relative rotational position is adapted for storage and filling of the bottle feeding device and the second relative rotational position is adapted for feeding an infant using the bottle feeding device;
- a rib extending around the first perimeter wall, wherein at least a portion of the rib extends around the first perimeter wall at an angle, and wherein the rib interacts with the top piece to limit rotation of the top piece with respect to the bottom piece;
- at least one of the bottom piece and top piece of the bottle body has a rounded ball shape to facilitate rotation from the first relative rotational position to the second relative rotational position;
- a flexible overmolding extending from at least one of the bottom piece of the bottle body and the top piece of the bottle body, toward the other of the bottom piece and the top piece of the bottle body to prevent pinch points between the bottom piece and top piece as the top piece is rotated with respect to the bottom piece;
- a top end of the top piece of the bottle body has a threaded portion which receives complementary threads of a nipple ring, and wherein the threaded portion and complementary threads include visual, audible, and/or tactile indicators to alert the user that the nipple ring is securely fastened to the top piece of the bottle body;
- a bottom end of the bottom piece of the bottle body has a perimeter groove to receive a hood to secure the hood to the bottom end;
- vent holes through the first perimeter wall to permit circulation of water about the bottle and to allow the bottle to sink within water during warming and sterilization;
- a nipple operatively affixed to the top piece of the bottle by a nipple ring coupled onto the top piece of the bottle; and
- a flexible drop-in liner to hold the liquid to be dispensed from the bottle which has a top opening, wherein the top opening of the liner is secured to the top piece of the bottle by the nipple ring and wherein the liner is in fluid communication with the nipple.

A second aspect of the present disclosure includes a method of feeding an infant, including the steps of positioning a liner in a top opening of a bottle. The bottle has a bottom piece with a first perimeter wall and a top piece with a second perimeter wall. The top piece is pivotally affixed to the bottom piece and rotatable with respect to the bottom piece about an axis extending generally orthogonally through the first perimeter wall and the second perimeter wall, with the top piece in a first relative rotational position with respect to the bottom piece. The liner is filled with a fluid. The top piece is rotated about the orthogonal axis to a second relative rotational position with respect to the bottom piece. The bottle is then positioned in an infant's mouth.

Embodiments of the second aspect can also include any one or a combination of the following features:
- installing a nipple through central hole of a nipple ring and affixing the nipple ring to the top opening of the bottle to secure the nipple and the liner to the bottle; and
- positioning the infant in a semi-upright position.

A third aspect of the present disclosure includes a method of manufacturing a bottle, including the steps of forming a bottom piece of a bottle having a perimeter wall and at least one detent feature. A top piece of the bottle is formed having a perimeter wall and at least one corresponding detent feature which interacts with the detent feature in the bottom piece. The top piece is pivotally affixed to the bottom piece of the bottle with a pivotal axis extending generally orthogonally through the first perimeter wall and the second perimeter wall. The detent features and corresponding detent features restrain the top piece into either a first relative rotational position or a second relative rotational position with respect to the bottom piece.

Embodiments of the second aspect can also include any one or a combination of the following features:

- at least one of the top piece or the bottom piece is formed from a clarified polypropylene material using an injection molding process; and
- at least one of the top piece or the bottom piece is formed from a clarified polypropylene material using an injection stretch blow molding process.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 6 is a side cross sectional view of another embodiment of a bottle according to the present concept;

FIG. 7 is a detailed cross sectional view of a pivot mechanism of the bottle shown in FIG. 6;

FIG. 8 is a side cross sectional view of the bottle shown in FIG. 6 in the angled position;

FIG. 9 is a side cross sectional view of yet another embodiment of a bottle according to the present concept;

FIG. 10 is a detailed cross sectional view of a pivot mechanism of the bottle shown in FIG. 9;

FIG. 11 is a detailed rear perspective view of the bottle shown in FIG. 9 in the angled position;

FIG. 12 is a side cross sectional view of the bottle shown in FIG. 9 in the angled position;

FIG. 13 is a side elevation view of yet another embodiment of a bottle according to the present concept;

FIG. 14 is a detailed cross sectional view of a pivot mechanism of the bottle shown in FIG. 13;

FIG. 15 is a side elevation view of the bottle shown in FIG. 13 in the angled position;

DETAILED DESCRIPTION OF THE PREFERRED EMBODIMENTS

Figure 1:
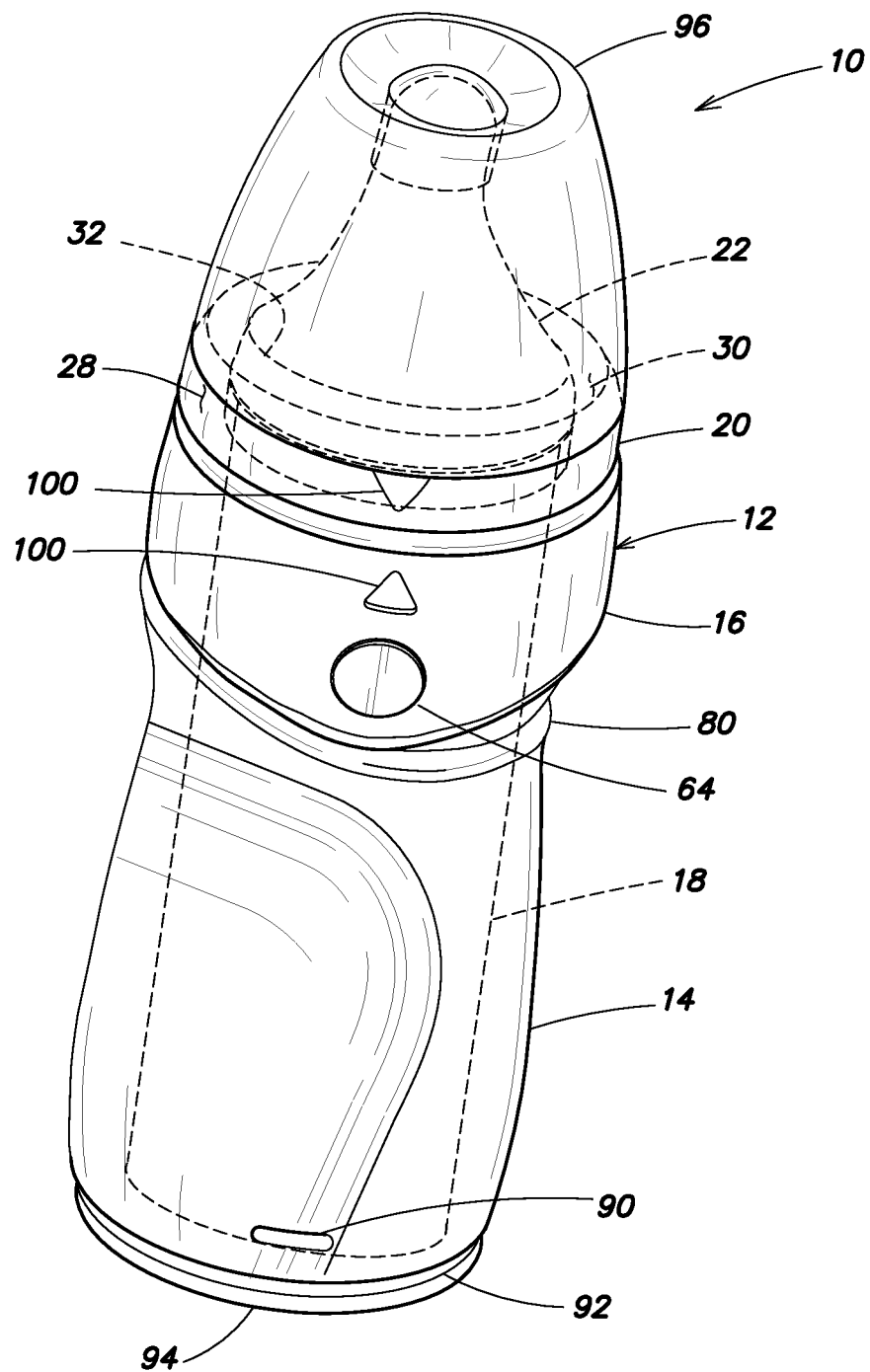
FIG. 1 is a top perspective view of an embodiment of a bottle feeding device according to the present concept as assembled for use.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
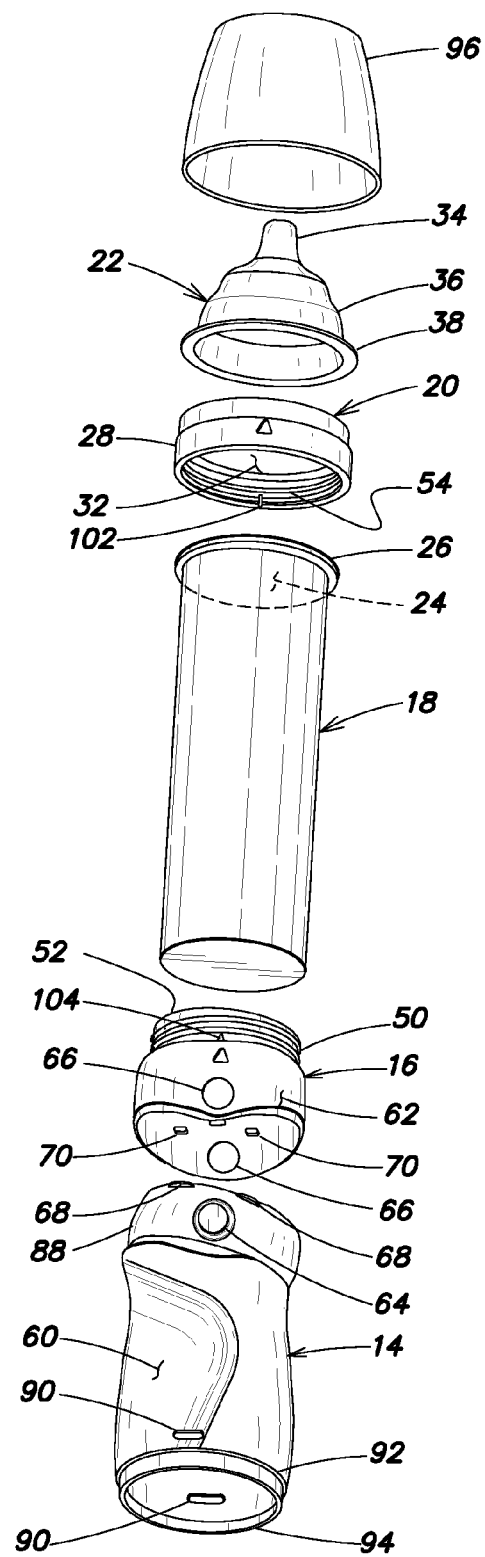
FIG. 2 is a bottom exploded perspective view of the bottle feeding device shown in FIG. 1.
Figure 3:
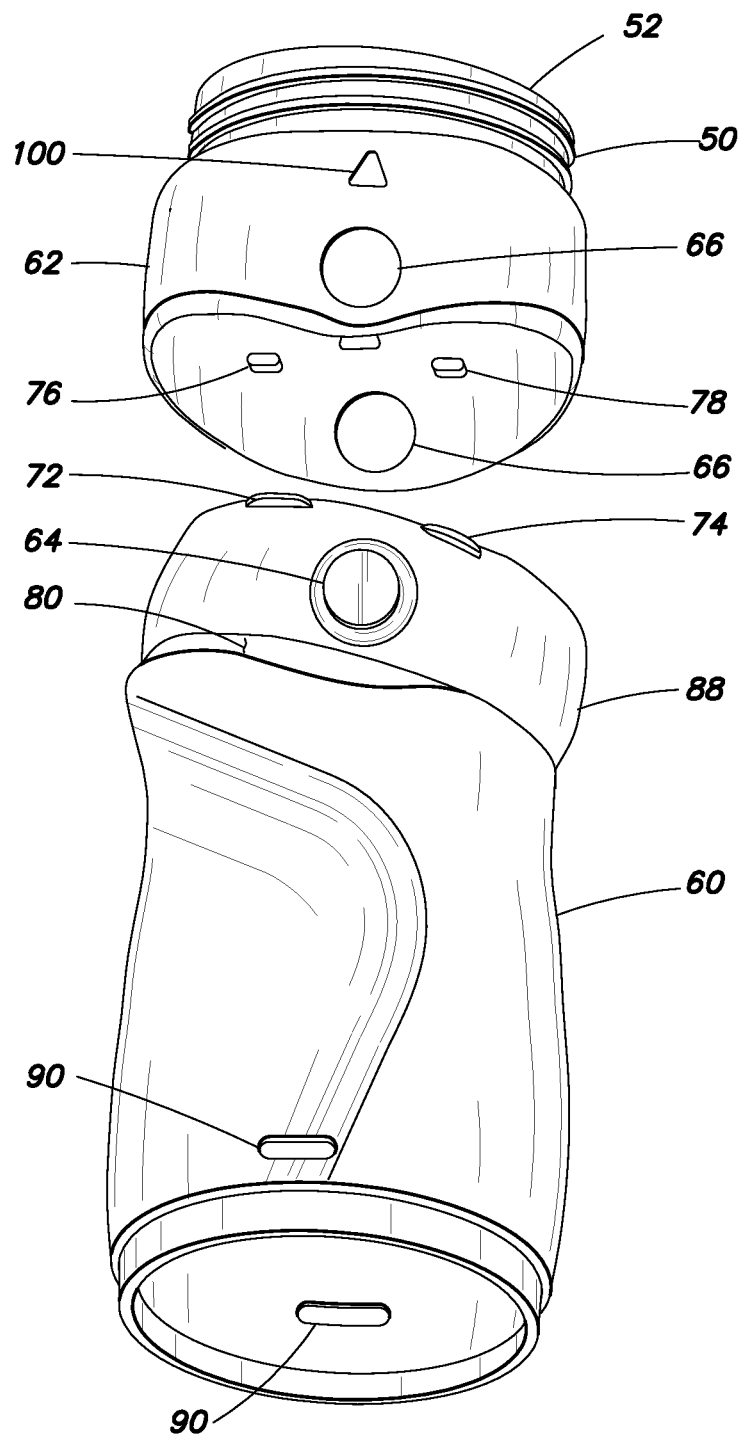
FIG. 3 is a bottom exploded perspective view of the bottle shown in FIG. 1.
Figure 4:
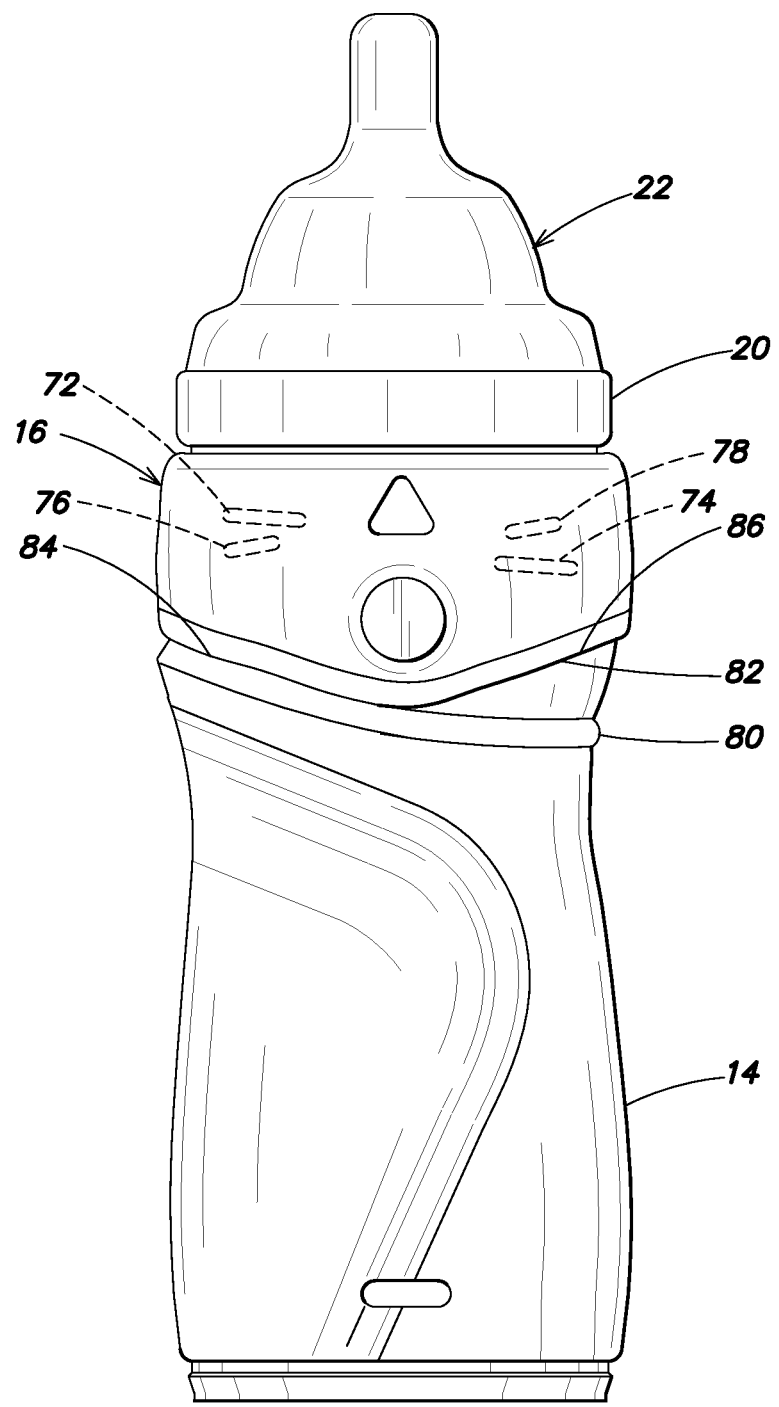
FIG. 4 is a side elevation view of the bottle feeding device shown in FIG. 1.
Figure 5:
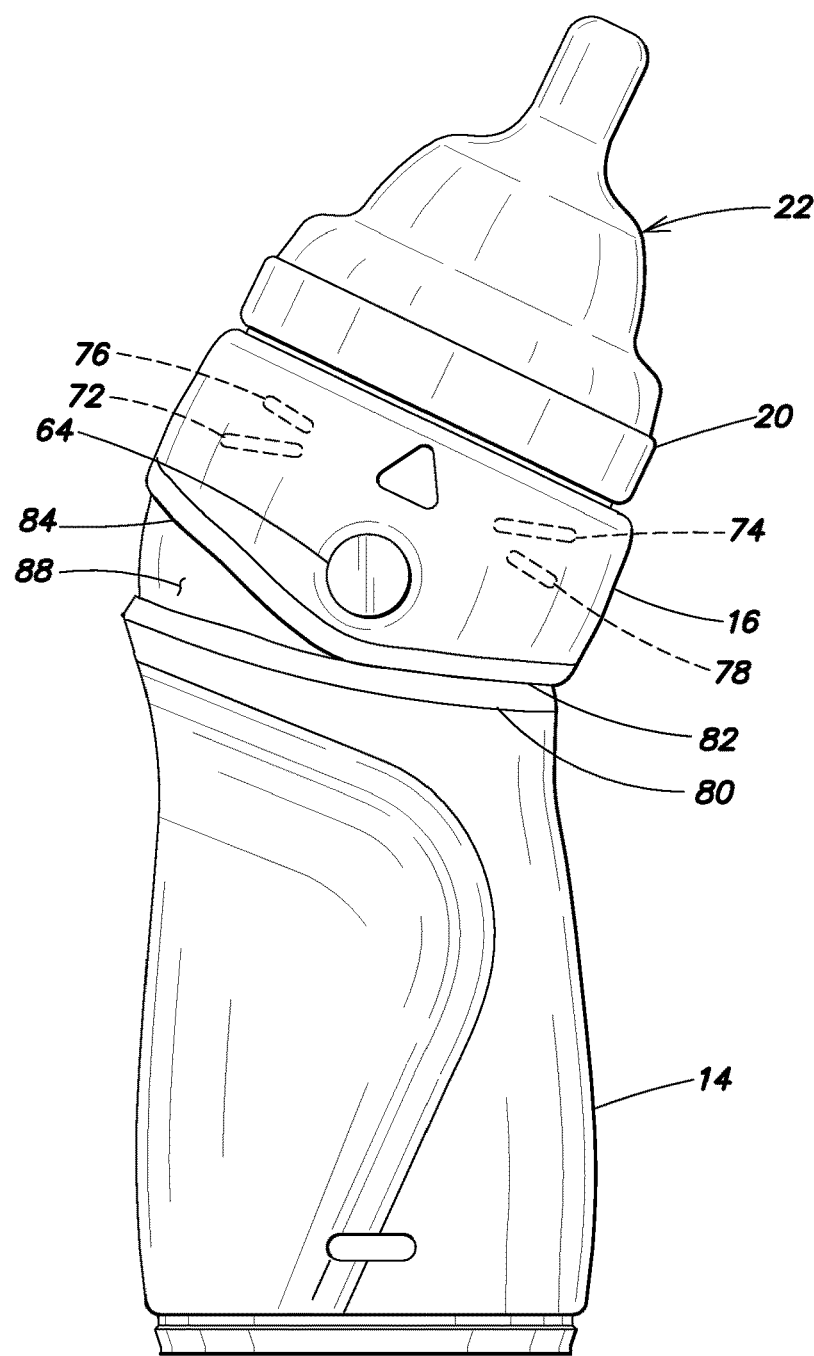
FIG. 5 is a side elevation view of the bottle feeding device shown in FIG. 1 in an angled position.
Figure 17:
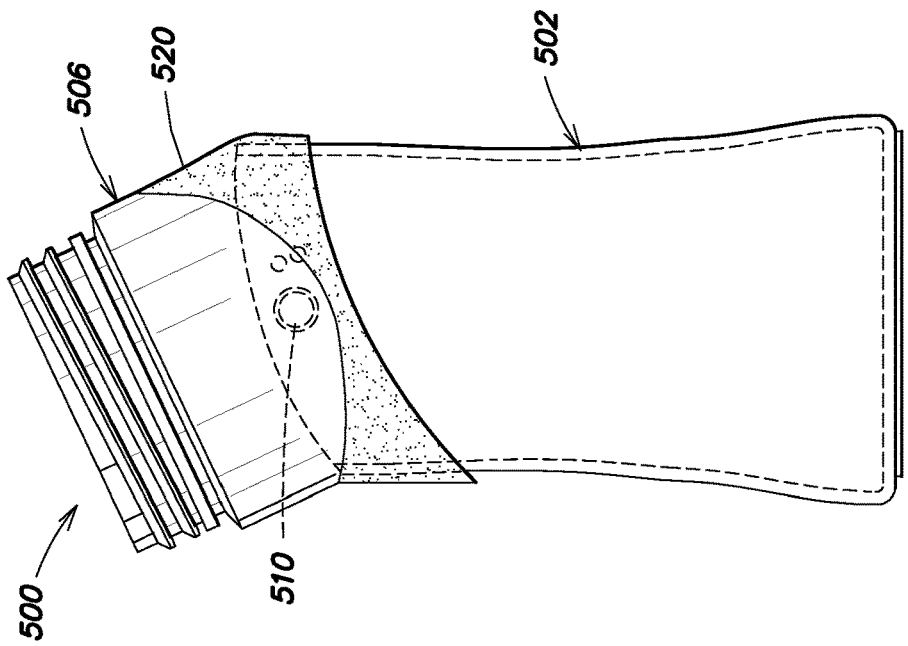
FIG. 17 is a side elevation view of the bottle shown in FIG. 16 in the angled position.
Figure 16:
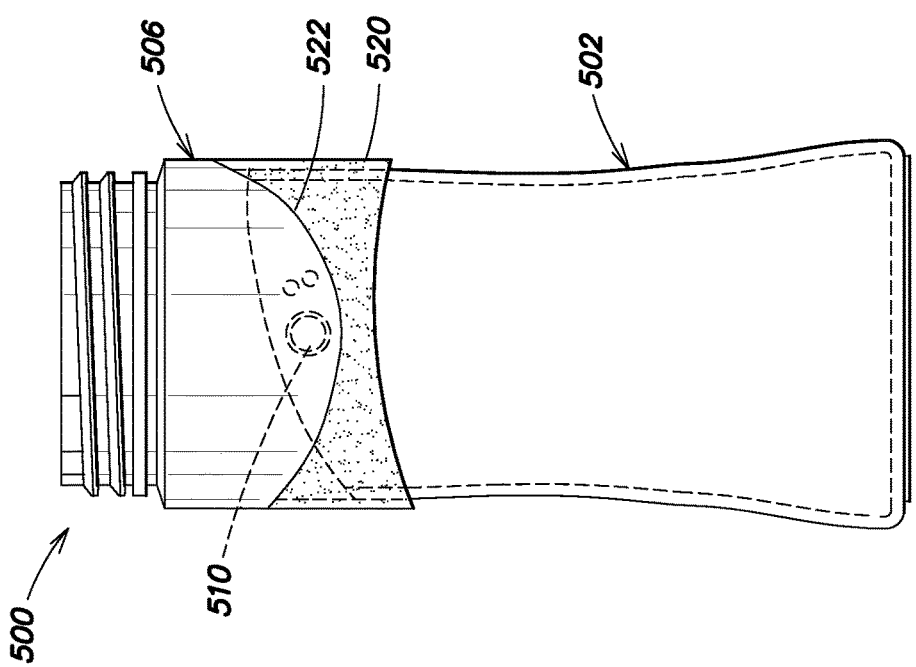
FIG. 16 is a side elevation view of yet another embodiment of a bottle according to the present concept.
Figure 18:
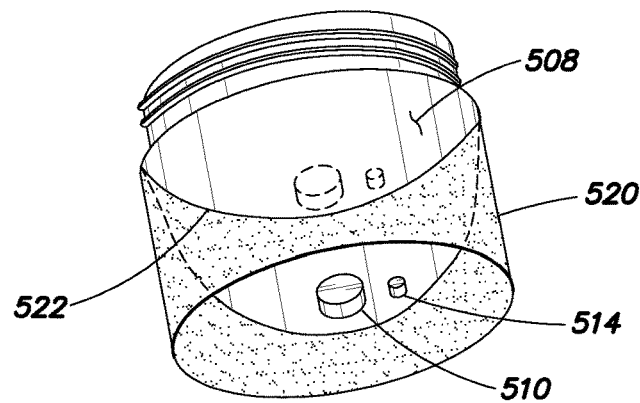
FIG. 18 is a bottom perspective view of a top piece of the bottle shown in FIG. 16.
Figure 19:
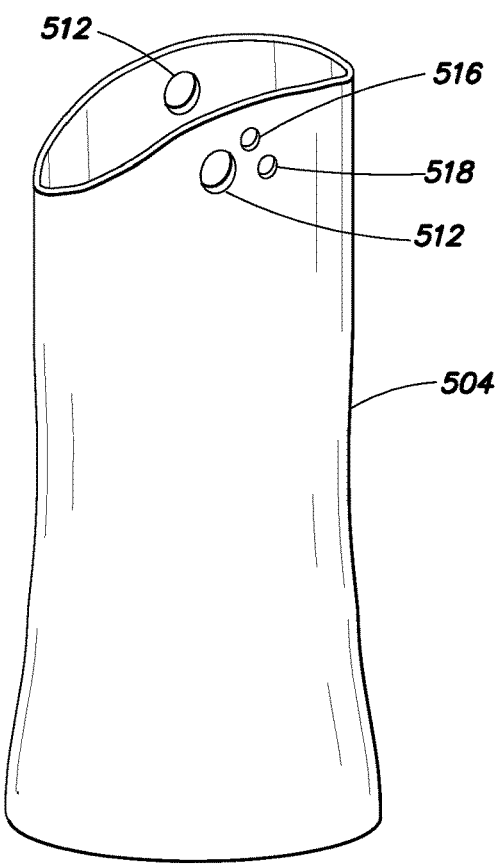
FIG. 19 is a top perspective view of a bottom piece of the bottle shown in FIG. 16.

FIGS. 1 and 2 generally depict a bottle feeding device 10, including a bottle body 12 (also referred to herein as the bottle) with a bottom piece 14 and a top piece 16, a drop in liner 18, a nipple ring 20, and a nipple 22. Both the nipple 22 and the liner 18 are secured to the bottle body 12 using the nipple ring 20 in the traditional manner. The liner 18 holds a liquid to be dispensed by the bottle feeding device 10, and is a flexible material which is preferably at least partially transparent to allow the user to view the amount of liquid remaining in the liner 18. Other indicators of the level of fluid remaining are optionally provided, such as volumetric markings on the liner 18 or bottle body 12. The liner 18, as shown in at least the embodiment depicted in FIGS. 1-2, is generally cylindrical in shape, with an open top 24 for the addition and dispensing of liquids and with a flange 26 extending outwardly from the open top. The nipple ring 20, used to secure the liner 18 and the nipple 22 to the bottle 12, includes a generally cylindrical wall 28 and a top surface 30, with the top surface 30 having a central hole 32 therethrough. The nipple ring 20 can be manufactured using any traditional or newly developed materials for nipple rings 20, and in at least one embodiment is manufactured using an injection molding process to form a polypropylene material. The nipple 22 includes a tip 34 and a base 36 with a flange 38 extending outwardly therefrom. The nipple 22 can also be manufactured using any traditional or newly developed materials for nipples, and in at least one embodiment is manufactured using an injection molding process to form a silicone rubber material.

A threaded portion 50 is adjacent a top edge 52 of the top piece 16. As used herein, "threaded" includes traditional threaded fastenings, bayonet-style fittings, hybrid fittings, or other known or hereafter developed fittings for attaching the nipple 22 or the nipple ring 20 to the bottle 12. To secure the liner 18 and the nipple 22 to the bottle 12, the liner 18 is placed within the bottle 12, with the flange 26 of the liner 18 placed above and adjacent to the top edge 52. The tip of the nipple 34 is pushed through the central hole 32 of the nipple ring 20, so that the flange 38 extending from the base 36 is below the top surface 30 of the nipple ring 20, inside the cylindrical wall 28 of the nipple ring 20. Threads 54 are provided on an interior side of the cylindrical wall 28. The threads 54 correspond with the threaded portion 50 of the bottle 12. When the nipple ring 20 is screwed onto the threaded portion 50, the flange 38 of the nipple 22 and the flange 26 of the liner 18 are trapped between the top surface 30 of the nipple ring 20 and the top edge 52 of the bottle 12. Although this concept is described for use with a liner 18, the bottle 10 described herein would also be useful without the use of a liner 18, with fluid to be dispensed from the bottle 10. If the liner 18 is not used, the bottle 10 must be appropriately sealed to contain liquid.

As shown in the embodiment depicted in FIGS. 1-5, the bottle 12 of the bottle feeding device 10 includes the bottom piece 14 and the top piece 16. The bottom piece 14 includes a first perimeter wall 60, and the top piece 16 includes a second perimeter wall 62. The embodiment depicted in FIGS. 1-5 has a generally cylindrical bottom piece 14 and top piece 16, though alternative bottle perimeter shapes could be used, including without limitation, trapezoidal, rectangular, rhomboidal, prismatic, oval, elliptical, or other arcuate or polygonal shape. The top piece 16 is pivotally affixed to the bottom piece 14 and is rotatable with respect to the bottom piece 14 about an axis extending generally orthogonally through the first perimeter wall 60 and the second perimeter wall 62. The pivotal connection between the bottom piece 14 and the top piece 16 in this embodiment is accomplished by a generally round post 64 extending from the bottom piece 14, which is received in a corresponding aperture 66 in the top piece 16. In at least one embodiment, the bottom piece 14 is formed using an injection stretch blow molding process using clarified polypropylene. In at least one embodiment, the top piece 16 is formed using an injection molding process using clarified polypropylene, with a collapsed core to build an undercut along the bottom edge of the top piece 16.

The bottom piece 14 has a first set of detent features 68, which interact with a second set of detent features 70 on the top piece 16 to limit the rotational movement of the top piece 16 with respect to the bottom piece 14. The detent features 68, 70 limit the rotation of the top piece 16 to certain predefined relative rotational positions with respect to the bottom piece 14. In at least the embodiment shown in FIGS. 1-5, the relative rotational position of the top piece 16 with respect to the bottom piece 14 is limited to a first relative rotational position and a second relative rotational position. In one embodiment, the relative rotational positions are predetermined to facilitate bottle storage and assembly in a first straight relative rotational position, and feeding of an infant in the second angled relative rotational position. In the embodiment depicted in FIGS. 1-5, in the first straight relative rotational position, the angle between a central axis of the bottom piece 14 and a central axis of the top piece 16 is about 0°. In the second relative rotational position, the angle between the central axis of the bottom piece 14 and the central axis of the top piece 16 is about 25°. The straight configuration of the first relative rotational position allows for compact storage of the bottle 12 and easy loading of the liner 18 in the bottle 12. The angled configuration of the second relative rotational position facilitates ergonomic feeding of an infant, making it easier for the caregiver to hold the infant in a semi-upright feeding position as recommended by pediatricians to reduce colic symptoms. The bottle 12 described herein is also intuitive for a caregiver to rotate from the straight position to the angled position.

In another embodiment, the central axis of the top piece 16 is at an angle of about −25° with respect to the central axis of the bottom piece 14 in the first relative rotational position and +25° with respect to the central axis of the bottom piece 14 in the second relative rotational position, so that the top piece 16 can be rotated from an angled position in one direction to an angled position in another direction. In other embodiments, the angles of the first relative rotational position and second relative rotational position are not symmetrical, and in still other embodiments the first relative rotational position could be provided in the same direction as the second relative rotational position, but to a different degree. A third relative rotational position, e.g., a straight relative rotational position, could also be provided where the first and second relative rotational positions are both at an angle. These various embodiments may allow the caregiver to use an alternate feeding position that is most comfortable for the particular caregiver and infant, including, as a non-limiting example an angle of 15° instead of 25°.

The detent features 68, 70 shown in the embodiment depicted in FIGS. 1-5 include two protrusions 72, 74 extending outwardly from the first perimeter wall 60 of the bottom piece 14, with a first protrusion 72 on one side of the post 64 and a second protrusion 74 on the other side of the post 64. Two corresponding protrusions 76, 78 extend inwardly from the second perimeter wall 62 of the top piece 16, a first corresponding protrusion 76 on one side of the aperture 66 and a second corresponding protrusion 78 on the other side of the aperture 66. The protrusions 72, 74 from the bottom piece 14 interact with the corresponding protrusions 76, 78 from the top piece 16 to resist rotational motion of the top piece 16 with respect to the bottom piece 14. In at least the embodiment depicted, one of the protrusions 72, 74 from the bottom piece 14 is higher than the other. Due to the offset height of the protrusions 72, 74 from the bottom piece 14, in the first relative rotational position, the corresponding protrusions 76, 78 extending from the top piece 16 are level, with one below the first bottom piece protrusion 76, and the other above the second bottom piece protrusion 78. In the second relative rotational position, the corresponding protrusions 72, 74 extending from the top piece 16 are at an offset height, with the first corresponding protrusion 76 higher than the first bottom piece protrusion 72 and the second corresponding protrusion 78 lower than the second bottom piece protrusion 74. This arrangement of detent features 72, 74, 76, 78 allows detent features 72, 76 on one side to engage in the second angled position and detent features 74, 78 to engage in the first straight position.

The embodiment depicted in FIGS. 1-5 further includes a perimeter rib 80 about the bottom piece 14. The rib 80 extends in a generally horizontal direction around the front of the perimeter wall 60. On the rear, the rib 80 extends in a diagonal direction extending upwards from each of the pivot axle posts 64. The top piece 16 of the bottle 12 includes a generally v-shaped bottom edge 82, with the point of the "v" corresponding to the pivot aperture 66. When the bottle 12 is in the first relative rotational position, one leg 84 of the v-shaped bottom edge 82 of the top piece 16 rests in part on the diagonal portion of the rib 80. When the bottle 12 is in the angled second relative rotational position, an opposite leg 86 of the v-shaped bottom edge 82 rests on the horizontal portion of the rib 80. The rib 80 around the bottom piece 14 and the v-shaped bottom edge 82 of the top piece 16 aid the detent features 68, 70 in restricting rotational movement to the first and second relative rotational positions. The bottom piece 14 also has a rounded contour 88 above the rib 80 to ease rotation of the top piece 16 from the first relative rotational position to the second angled relative rotational position, and to reduce pinch points caused by such rotation. The top piece 16 has a rounded or undercut bottom edge 82, to further reduce pinch points between the top piece 16 and the bottom piece 14 of the bottle 12.

In other embodiments, the round post 64 and the detent features 68, 70 may be replaced with a mechanical equivalent, such as a ratchet-type system or a cam system. The generally round post 64 described herein, which is received in the corresponding aperture 66, provides the advantage of having less likelihood of having small parts shear off or otherwise become separated from the bottle 12, reducing the risk of small parts becoming choking hazards for infants or young children.

At least the embodiment depicted in FIGS. 1-5 includes vent holes 90 through the bottle 12 and a perimeter groove 92 about a bottom edge 94 of the bottle 12. The vent holes 90 through the bottle 12 permit water to circulate around the bottle 12 and permit the bottle 12 to sink in a water bath for sterilization or for heating the liquid in the bottle 12. The groove 92 around the bottom edge 94 of the bottle 12 allows a hood 96 to be snap fit onto the bottom edge 94 of the bottle 12 while the bottle 12 is being used to dispense the liquid. This prevents loss of the hood 96 while feeding, especially while feeding on-the-go.

At least the embodiment depicted in FIGS. 1-5 also includes features to ensure that the nipple ring 20 is sufficiently tightened. The nipple ring 20, as described above, secures the liner 18 and the nipple 22 to the bottle 12, and therefore insufficient tightening of the nipple ring 20 would allow liquid held by the liner 18 to leak, or could allow fluid from a water bath to enter the liner 18, resulting in possible contamination of the liquid. To ensure that caregivers are able to repeatably tighten the nipple ring 20, the bottle 12 and the nipple ring 20 each have a visible indicator 100. To further facilitate circulation of water around the bottle 12, the visual indicator on the bottle 12 can also be a cutout in the bottle 12. The visible indicators 100 are aligned when the nipple ring 20 is appropriately tightened. Additionally, a vertical groove 102 is formed in the interior surface of the cylindrical wall 28 of the nipple ring 20, and a protrusion 104 is formed on the bottom edge of the threaded portion 50 of the bottle 12, such that when the nipple ring 20 is screwed onto the bottle 12 to the sufficient degree, the protrusion 104 is received in the groove 102, making an audible clicking noise and/or providing a tactile sensation to alert the caregiver that the nipple ring 20 is tight enough. Such features to ensure sufficient tightening of the nipple ring are further described in U.S. patent application Ser. No. 12/411,752, filed Mar. 26, 2009, entitled SEAL INDICATION MECHANISM FOR CONTAINERS and U.S. patent application Ser. No. 13/447,838, filed Apr. 16, 2012, entitled BOWL WITH LID.

To manufacture a bottle feeding device 10 as shown in FIGS. 1-5, the bottom piece 14 is formed, having the first perimeter wall 60 and the first set of detent features 68. The top piece 16 is also formed, having the second perimeter wall 62 and the second set of detent features 70 which interacts with the detent features 68 in the bottom piece 14. The top piece 16 is pivotally affixed to the bottom piece 14 with the pivotal axis extending generally orthogonally through the first perimeter wall 60 and the second perimeter wall 62. The first and second sets of detent features 68, 70 restrain the top piece 14 into the first relative rotational position or the second relative rotational position with respect to the bottom piece 14. The bottom piece 14 and the top piece 16 are formed from materials suitable for use in infant feeding devices, with one non-limiting example being a clarified polypropylene material. The methods used to form the bottom piece 14 and the top piece 16 are dependent upon the material and the desired shape. As another non-limiting example, to form the bottle 12 as depicted in FIGS. 1-5, the bottom piece 14 and the top piece 16 could be formed using an injection molding process or an injection stretch blow molding process.

FIGS. 6-8 depict another embodiment of a bottle 200. The bottle 200 includes a bottom piece 202 having a first perimeter wall 204 and a top piece 206 having a second perimeter wall 208. The top piece 206 is pivotally affixed to the bottom piece 202 and is rotatable with respect to the bottom piece 202 about an axis extending generally orthogonally through the first perimeter wall 204 and the second perimeter wall 208. The pivotal connection between the bottom piece 202 and the top piece 206 in at least this embodiment is accomplished by a post 210 molded into the top piece 206, which extends through a corresponding aperture 212 through the bottom piece 202 when the top piece 206 is placed radially inwardly from the first perimeter wall 204.

In at least the embodiment depicted in FIGS. 6-8, the top piece 206 of the bottle 200 includes detent features at an angle of approximately 90° radially from the pivot post 210, at the rear of the bottle 200, including an upper tab 216 and a lower tab 218. Each tab 216, 218 acts as a release button and sets the angle of the top piece 206 with respect to the bottom piece 202 at the desired predetermined relative rotational positions by their interaction with a top edge 220 of the bottom piece 202. In at least this embodiment, the predetermined relative rotational positions are also illustrated at 0° and 25°, respectively. The top piece 206 of the bottle 200 includes a cylindrical threaded portion 222 adjacent a top edge 224, and a spherical portion 226 below the threaded portion 222. The spherical portion 226 facilitates rotation of the top piece 206 with respect to the bottom piece 202 of the bottle 200. The spherical portion 226 also includes a first side 228 which is longer than a second side 230, extending further into the bottom piece 202 when the bottle 200 is in the straight first relative rotational position. As the top piece 206 is rotated into the second angled relative rotational position, the shorter second side 230 of the top piece 206 is rotated into the bottom piece 202 of the bottle 200. Because the second side 230 is shorter, it does not interfere with a top opening 232 of the bottom piece 202 as much when the bottle 200 is in the second angled relative rotational position as it would if it was the same length as the other side 228. This prevents pinching of the liner 18 (shown in FIGS. 1-2) and allows less restricted flow of the liquid in the liner 18.

FIGS. 9-12 depict yet another embodiment of a bottle 300 according to the present disclosure. In at least this embodiment, the bottle 300 includes a bottom piece 302 having a first perimeter wall 304 and a top piece 306 having a second perimeter wall 308. The top piece 306 is pivotally affixed to the bottom piece 302 and is rotatable with respect to the bottom piece 302 about an axis extending generally orthogonally through the first perimeter wall 304 and the second perimeter wall 308. The pivotal connection between the bottom piece 302 and the top piece 306 in at least this embodiment is accomplished by a pivot post 310 molded into the top piece 306, which extends through a corresponding aperture 312 through the bottom piece 302 when the top piece 306 is placed radially inwardly from a top edge 314 of the bottom piece 302. Similarly to the embodiment described above, the top piece 306 of the bottle 300 includes a cylindrical threaded portion 316 at an upper edge 318 and a spherical portion 320 at a lower edge 322. A cylindrical portion 324 separates the threaded portion 316 and spherical portion 320.

In at least the embodiment depicted in FIGS. 9-12, the top piece 306 of the bottle 300 includes detent features at approximately 90° and approximately 270° radially from the pivot post 310 (at the rear side and the front side of the bottle 300, respectively), including an upper rib 326 and a lower rib 328 at the rear side, and a bump 330 at the front side. The detent features 326, 328, 330 set the angle of the top piece 306 with respect to the bottom piece 302 at the desired predetermined relative rotational positions by their interaction with the top edge 314 of the bottom piece 302. The bump 330 at the front and the upper rib 326 at the rear prevent rotation of the bottle 300 from the first straight relative rotational position. After the resistance of the bump 330 and the upper rib 326 is overcome to rotate the top piece 306 to the second angled relative rotational position, the cylindrical portion 324 of the top piece 306 and the lower rib 328 maintain the bottle 300 in the second angled relative rotational position. The cylindrical portion 324 of the bottle 300 interferes with the top edge 314 of the bottom piece 302, preventing rotation further than the predetermined second relative rotational position, while the lower rib 328 prevents rotation of the bottle 300 back to the first relative rotational position until enough force is applied to overcome the force of the rib 328 against the top edge 314 of the bottom piece 302. In at least this embodiment, the predetermined relative rotational positions are also illustrated at 0° and 25°, respectively.

FIGS. 13-15 depict yet another embodiment of a bottle 400 according to the present disclosure. In at least this embodiment, the bottle 400 includes a bottom piece 402 having a first perimeter wall 404 and a top piece 406 having a second perimeter wall 408. The top piece 406 is pivotally affixed to the bottom piece 402 and is rotatable with respect to the bottom piece 402 about an axis extending generally orthogonally through the first perimeter wall 404 and the second perimeter wall 408. The pivotal connection between the bottom piece 402 and the top piece 406 in at least this embodiment is accomplished by a post 410 molded into the top piece 406, which extends through a corresponding aperture 412 through the bottom piece 402 when the top piece 406 is placed inside a top edge 414 of the bottom piece 402. The top piece 406 of the bottle 400 includes a cylindrical threaded portion 416 at an upper edge 418, and a tapered spherical lower edge 420.

In at least the embodiment depicted in FIGS. 13-15, the top piece 406 and the bottom piece 402 include detent features which set the angle of the top piece 406 with respect to the bottom piece 402 at desired predetermined relative rotational positions, a straight first relative rotational position and an angled second relative rotational position. The detent feature 422 on the top piece 406 includes a flex tab 422 extending downwardly from the post 410. The detent features 424, 426 on the bottom piece 402 include two stop ribs 424, 426 extending inwardly from the cylindrical wall 404. The first stop rib 424 is located near the aperture 412, so that the flex tab 422 cannot extend past the first stop rib 424, and therefore the first stop rib 424 limits the top piece 406 to the first straight relative rotational position. The second stop rib 426 is located a further distance from the aperture 412, resulting in friction applied to the flex tab 422 that can be overcome by the caregiver to rotate the top piece 406 from the first relative rotational position to the second relative rotational position and vice versa. The angle of the top piece 406 of the bottle 400 in the first relative rotational position is determined by the placement of the first stop rib 424 and is about 0° as shown in FIGS. 13-15, and the second angled relative rotational position is controlled by the placement of the second stop rib 426, is about 25° in at least this embodiment.

Also, in at least the embodiment depicted in FIGS. 13-15, the bottom piece 402 has an overmold 428 extending upwardly from the top edge 414, which conforms to the second cylindrical wall 408 of the top piece 406 of the bottle 400, and helps to prevent pinch points between the bottom piece 402 and the top piece 406. The overmold 428 is generally a more flexible, elastic material than the top piece 406 and the bottom piece 402. The overmold 428 is optionally molded with preload to conform to the top piece 406 when it is rotated to the second angled relative rotational position.

FIGS. 16-19 depict yet another embodiment of a bottle 500 according to the present disclosure. In at least this embodiment, the bottle 500 includes a bottom piece 502 having a first perimeter wall 504 and a top piece 506 having a second perimeter wall 508. The top piece 506 is pivotally affixed to the bottom piece 502 and is rotatable with respect to the bottom piece 502 about an axis extending generally orthogonally through the first perimeter wall 504 and the second perimeter wall 508. The pivotal connection between the bottom piece 502 and the top piece 506 in this embodiment is accomplished by a post 510 extending inwardly from the second perimeter wall 508 of the top piece 506 and through a corresponding aperture 512 in the first perimeter wall 504 of the bottom piece 502. In at least this embodiment, when assembled, the second perimeter wall 508 of the top piece 506 is located radially outwardly from the first perimeter wall 504 of the bottom piece 502.

In at least the embodiment depicted in FIGS. 16-19, the top piece 506 and the bottom piece 502 include detent features which set the angle of the top piece 506 with respect to the bottom piece 502 at desired predetermined relative rotational positions, a first straight relative rotational position and a second angled relative rotational position. The top piece 506 includes an inwardly extending post 514, and the bottom piece 502 has two corresponding recesses 516, 518. In the first straight relative rotational position the post 514 extends through one of the corresponding recesses 516, and in the second angled relative rotational position the post 514 extends through the other corresponding recess 518. The angle of the top piece 506 of the bottle 500 in the first relative rotational position and the second relative rotational position are determined by the configuration of the post 514 and the corresponding recesses 516, 518. The relative rotational positions shown in FIGS. 16-19 are about 0° and about 25°, respectively.

Also, at least in the embodiment depicted in FIGS. 16-19, the top piece 506 has an overmold 520 extending downwardly from a bottom edge 522, which conforms to the first perimeter wall 504 of the bottom piece 502 of the bottle 500, and helps to prevent pinch points between the bottom piece 502 and the top piece 506. The overmold 520 is generally a more flexible, elastic material than the top piece 506 and the bottom piece 502. Depending on the durometer and thickness of the overmold 520, it can be configured to conform to the outside of the first perimeter wall 504 when the bottle 500 is in the first relative rotational position and the second relative rotational position.

Figure 21:
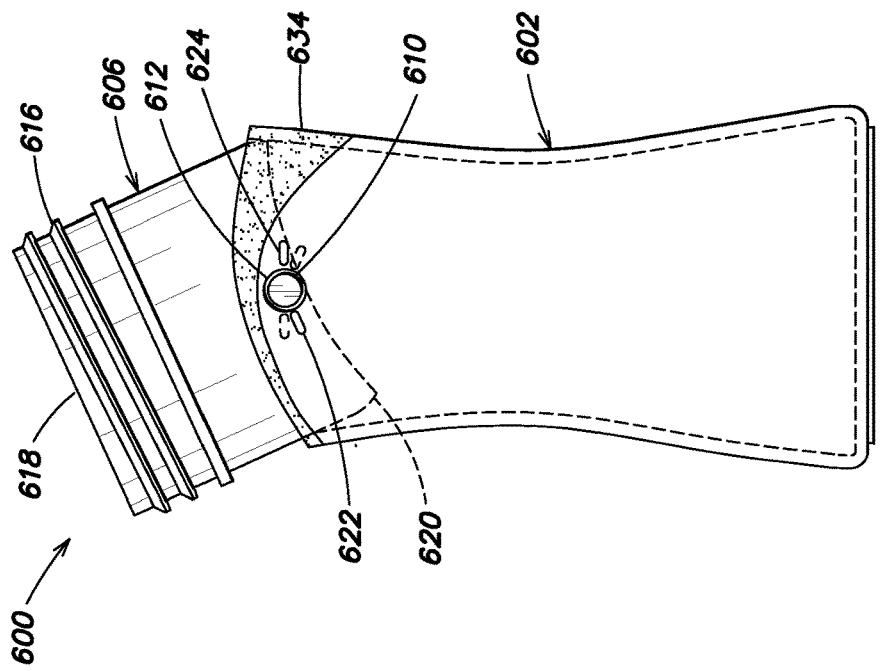
FIG. 21 is a side elevation view of the bottle shown in FIG. 20 in the angled position.
Figure 20:
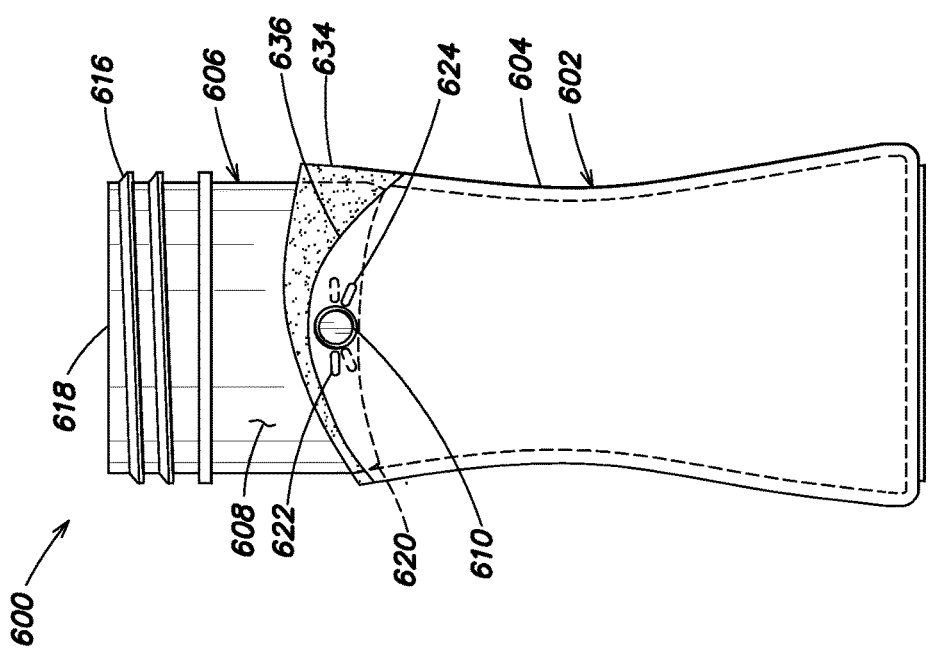
FIG. 20 is a side elevation view of yet another embodiment of a bottle according to the present concept.
Figure 22:
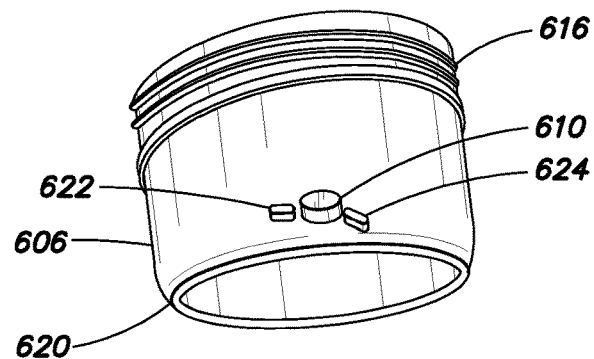
FIG. 22 is a bottom perspective view of a top piece of the bottle shown in FIG. 20.
Figure 23:
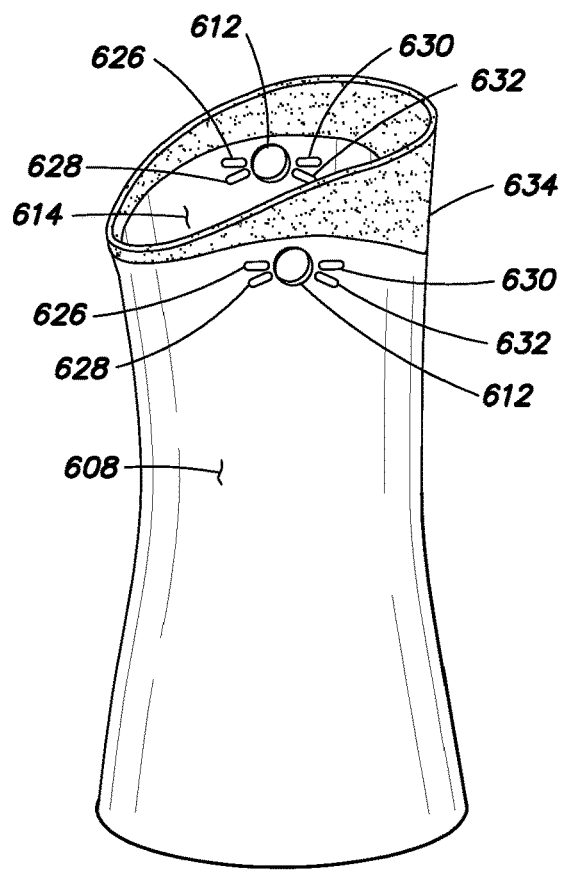
FIG. 23 is a top perspective view of a bottom piece of the bottle shown in FIG. 20.

FIGS. 20-22 depict yet another embodiment of a bottle 600 according to the present disclosure. In at least this embodiment, the bottle 600 includes a bottom piece 602 having a first perimeter wall 604 and a top piece 606 having a second perimeter wall 608. The top piece 606 is pivotally affixed to the bottom piece 602 and is rotatable with respect to the bottom piece 602 about an axis extending generally orthogonally through the first perimeter wall 604 and the second perimeter wall 608. The pivotal connection between the bottom piece 602 and the top piece 606 in this embodiment is accomplished by a post 610 molded into the top piece 606, which extends through a corresponding aperture 612 through the bottom piece 602 when the top piece 606 is placed into a top opening 614 of the bottom piece 602. The top piece 606 of the bottle 600 includes a cylindrical threaded portion 616 at an upper edge 618 and a tapered spherical lower edge 620. The tapered spherical lower edge 620 of the top piece 606 helps to maintain a tight seam with the bottom piece 602 during rotation of the top piece 606 to the second angled relative rotational position.

In at least the embodiment depicted in FIGS. 20-22, the top piece 606 and the bottom piece 602 include detent features which set the angle of the top piece 606 with respect to the bottom piece 602 at desired predetermined relative rotational positions, a first straight relative rotational position and a second angled relative rotational position. The detent features on the top piece 606 include two snap ribs 622, 624 molded into the perimeter wall 608 of the top piece 606 and extending radially outwardly from the post 610. Corresponding recesses 626, 628, 630, 632, which receive the snap ribs 622, 624 are molded into the bottom piece 602. The angle of the top piece 606 of the bottle 600 in the first relative rotational position and in the second relative rotational position is determined by the configuration of the snap ribs 622, 624 and the corresponding recesses 626, 628, 630, 632. As shown in FIGS. 20-22, the first relative rotational position is about 0° and the second angled relative rotational position is about 25°.

Also, in at least the embodiment depicted in FIGS. 20-22, the bottom piece has an overmold 634 extending upwardly from a curved top edge 636. The overmold 634 is asymmetrical, with one side having a greater height to accommodate the second angled relative rotational position. The overmold 634 as used in this embodiment sees little deflection during the rotation of the top piece 606, and therefore a piece with a durometer that is near that of the top and bottom pieces 602, 606 of the bottle 600 is acceptable.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired embodiment and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:

1. A bottle feeding device, comprising:
  a bottom piece of a bottle body having a first perimeter wall, the bottom piece having a bottom piece upper end that is opposite a bottom piece lower end, the bottom piece having a bottom piece central vertical axis;
  a top piece of the bottle body having a second perimeter wall, wherein the top piece has a top piece upper end and a top piece lower end opposite the top piece upper end, the top piece having a top piece central vertical axis, the top piece is pivotally affixed to the bottom piece such that the top piece lower end is proximal the bottom piece upper end, and the top piece is rotatable with respect to the bottom piece about an axis extending generally orthogonally through the first perimeter wall and the second perimeter wall;
  a liner forming a continuous storage volume, the liner positioned within the bottom piece and the top piece such that a liner opening is contiguous with the top piece upper end; and
  a nipple attachable to the top piece upper end, the nipple attachable to the top piece upper end;
  wherein the top piece is rotatable about the bottom piece in an upper portion of the bottle feeding device such that the top piece is radially outward of the bottom piece,
  wherein the top piece has a first relative rotational position and a second relative rotational position different from the first relative rotational position, and
  wherein the top piece central vertical axis is aligned with the bottom piece central vertical axis in the first relative rotational position,
  wherein the top piece central vertical axis is angled with respect to the bottom piece central vertical axis in the second relative rotational position,
  wherein the top piece is pivotally affixed to the bottom piece about the bottom piece central vertical axis such that the top piece is able to rotate to a second relative rotational position by rotating in a first direction and a second direction, and wherein both the first relative rotational position and the second relative rotational position completely encompass a perimeter wall of the liner, at least at a region where the top piece is pivotally affixed to the bottom piece, to prevent pinch points.

2. The bottle feeding device of claim 1, further comprising:
a pair of detent features to restrain the bottom piece and the top piece into either a first relative rotational position or a second relative rotational position.

3. The bottle feeding device of claim 2, wherein each detent feature includes a first protrusion from the first perimeter wall, and a corresponding second protrusion from the second perimeter wall which interacts with the first protrusion to resist rotational motion.

4. The bottle feeding device of claim 2, wherein each detent feature includes a protrusion from the first perimeter wall and a corresponding indent in the second perimeter wall which interacts with the protrusion to resist rotational motion.

5. The bottle feeding device of claim 2, wherein an angle between a central axis of the bottom piece and a central axis of the top piece is about 0° in the first relative rotational position and the angle between the central axis of the bottom piece and the central axis of the top piece is about 25° in the second relative rotational position.

6. The bottle feeding device of claim 2, wherein the first relative rotational position is adapted for storage and filling of the bottle feeding device and the second relative rotational position is adapted for feeding an infant using the bottle feeding device.

7. The bottle feeding device of claim 1, further comprising a rib extending around the first perimeter wall, wherein at least a portion of the rib extends around the first perimeter wall at an angle, and wherein the rib interacts with the second piece to limit rotation of the second piece with respect to the bottom piece.

8. The bottle feeding device of claim 7, wherein at least one of the bottom piece and top piece of the bottle body has a rounded ball shape to facilitate rotation from the first relative rotational position to the second relative rotational position.

9. The bottle feeding device of claim 1, further comprising:
a flexible overmolding extending from at least one of the bottom piece of the bottle body and the top piece of the bottle body, toward the other of the bottom piece and the top piece of the bottle body to prevent pinch points between the bottom piece and top piece as the top piece is rotated with respect to the bottom piece.

10. The bottle feeding device of claim 1, wherein a top end of the top piece of the bottle body has a threaded portion which receives complementary threads of a nipple ring, and wherein the threaded portion and complementary threads include visual, audible and tactile indicators to alert the user that the nipple ring is securely fastened to the top piece of the bottle body.

11. The bottle feeding device of claim 1, wherein a bottom end of the bottom piece of the bottle body has a circumferential groove to receive a hood to secure the hood to the bottom end.

12. The bottle feeding device of claim 1, further comprising vent holes through the first perimeter wall to permit circulation of water about the bottle and to allow the bottle to sink within water during warming and sterilization.

13. The bottle feeding device of claim 1, further comprising:
a nipple, operatively affixed to the top piece of the bottle by a nipple ring coupled onto the top piece of the bottle.

14. The bottle feeding device of claim 13, wherein the liner is flexible and configured to hold the liquid to be dispensed from the bottle which has a top opening, wherein the top opening of the liner is secured to the top piece of the bottle by the nipple ring and wherein the liner is in fluid communication with the nipple.

15. The bottle feeding device of claim 1, wherein the top piece lower end has a diameter that is generally the same size as the bottom piece lower end.

* * * * *